United States Patent [19]

Weiss et al.

[11] 3,786,257

[45] Jan. 15, 1974

[54] NUCLEAR FAILED FUEL DETECTION SYSTEM

[75] Inventors: Harald H. Weiss, Vienna, Austria; Robert J. Johnson, Atlanta, Ga.

[73] Assignee: Westinghouse Electric Corporation, Pittsburgh, Pa.

[22] Filed: Aug. 12, 1971

[21] Appl. No.: 171,108

[52] U.S. Cl. ...... 250/83.3 R, 176/19 LD, 250/83.1, 250/83.6 FT
[51] Int. Cl. ...... G01t 1/16, G01t 3/00, G21c 17/02
[58] Field of Search .................. 250/83.1, 83.3 R, 250/83.6 FT; 176/19 R, 19 LD

[56] References Cited
UNITED STATES PATENTS

| | | | |
|---|---|---|---|
| 2,751,505 | 6/1956 | Anderson | 250/83.1 |
| 3,413,469 | 11/1968 | Guyonvarh et al. | 250/83.6 FT X |
| 3,514,598 | 5/1970 | Youmans | 250/83.3 R |
| 3,577,158 | 5/1971 | Hahn | 250/83.1 X |
| 3,612,860 | 10/1971 | Hackney | 250/83.1 X |

*Primary Examiner*—Archie R. Borchelt
*Attorney*—A. T. Stratton et al.

[57] ABSTRACT

A system is disclosed which utilizes multiple radiation detectors to establish the isotopic or pseudo isotopic (weighted average of several isotopes) content of radiation sources on a continuous on-line basis. A specific application which utilizes this principle is a failed fuel monitor which continuously monitors the delayed neutron and gamma activity emanating from the primary coolant of a nuclear reactor. Employing two neutron detectors, the system has the ability to distinguish between activity from failed fuel and from fuel rod surface contamination. Applying a technique to compensate for activity build-up in the primary coolant loop, the system makes it possible to interpret the signals even during power transients. The provision of a third detector responsive to the gamma radiation emitted from the primary coolant in the reactor coolant loop enables the system to distinguish between enlarged cladding failures in already failed fuel rods and additional fuel failures.

18 Claims, 5 Drawing Figures

3,786,257

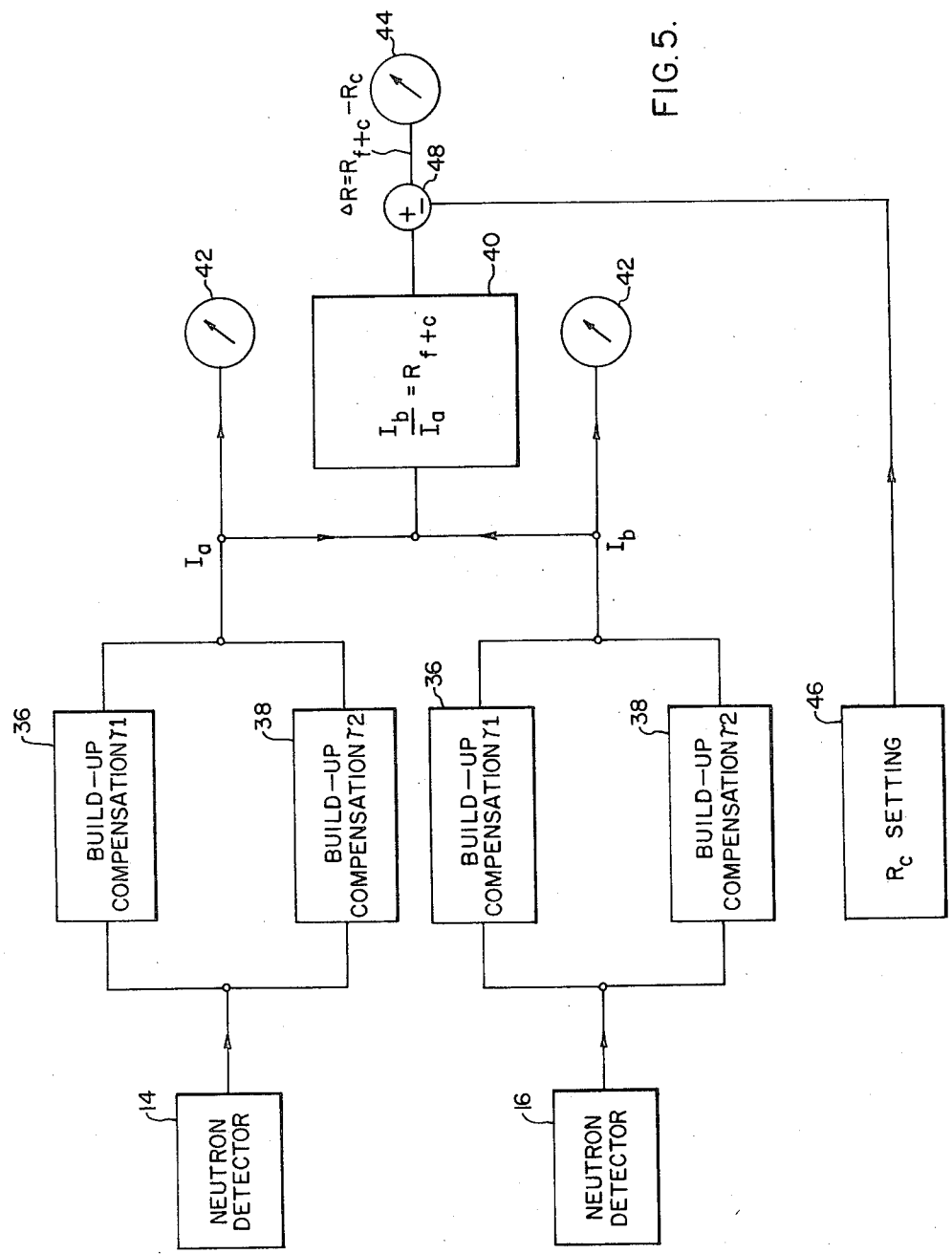

NUCLEAR FAILED FUEL DETECTION SYSTEM

BACKGROUND OF THE INVENTION

This invention pertains in general to a system for detecting the presence of failed fuel rods within the core a nuclear reactor and more particularly to such a system that continuously monitors the primary coolant for fission products from failed fuel and identifies the activity and interprets the measurements during both steady state and power transient conditions.

It is extremely important during the operation of large power reactors to continuously monitor the primary coolant for fission products from potential fuel failures. The present technique of taking chemistry samples from time to time and analyzing the fission products present does not fulfill the requirements. A further problem is discriminating between fission products from failed fuel and from uranium surface contamination of the fuel rods. Additionally, the monitoring signal should be independent of reactor power levels and should allow proper interpretation during power transients.

The delayed neutron activity in the reactor coolant has been used several times as an indication of the presence of failed fuel within the reactor core. However, especially for the case of small amounts of failed fuel, the fission product activity in the coolant from U-235 contamination of fuel rod surfaces can be of the same order of magnitude as from failed fuel. Thus, the detection of delayed neutrons within the reactor coolant does not necessarily indicate the presence of failed fuel.

Furthermore, there are delayed neutrons in the coolant which stem from the decay of N-17, which is produced in the coolant by a $(n, p)$ reaction with deterium. However, the half life of N-17 is only 4.14 seconds so that by the proper choice of a delay time to the neutron detector (about 60 sec.) most of N-17 activity will decay before the fluid reaches the detector. An alternate approach, which has been used in the past to distinguish between the N-17 activity in the coolant and the two long lived groups of delayed neutrons from fission products (Br-87, 54.5 sec. half life and I-137 + BR-88, 22.7 sec. half life) is the usage of two neutron detectors at different delay times. From the ratio of both signals the presence of fission products can be identified. However, it is not possible to distinguish between the fission products from failed fuel and from surface contamination. Although the signal ratio is independent of the reactor power level, the ratio does not follow the true isotopic ratio in the coolant during power transient conditions, due to the build-up effect of the activity within the coolant. The build-up effect results from the fact that the total transport time in the primary coolant loop of a reactor is of the same order of magnitude or even less than the half lives of the neutron emitters. Thus, the activity has not fully decayed when the coolant reenters the reactor core. The build-up factor is given for the i-th isotope by:

$$B_i = \frac{e^{\lambda_i t_1}}{e^{\lambda_i t_1} - 1};$$

where $\lambda_i$ is the decay constant of the isotope and $t_l$ is the total loop transport time. Practical experience indicates that the observation of fission product release during power transient conditions is very important in determining the mechanism of fuel failures.

The build-up effect also reduces the sensitivity of the system to detect additional fuel failures in the presence of already failed fuel for a period of several minutes after the additional failures occur. The reason for this is that the build-up from previous has not yet finished and the activity in the coolant is relatively higher compared to the activity of the additional failure which has not yet reached its final build-up value.

SUMMARY OF THE INVENTION

In order to overcome the disadvantages of the prior art, this invention provides a system which utilizes multiple radiation detectors for monitoring the radiation emanating from the coolant of a nuclear reactor at different delay times. The ratio of the signals received from the detectors gives an indication of the presence of failed fuel and distinguishes over the signals received from fuel rod surface comtamination. Applying a technique to compensate for the activity build-up in the primary loop, this system makes it possible to interpret the detector signals even during power transient periods.

In the specific exemplary embodiment to be described, the system of this invention utilizes two neutron detectors. The first detector monitors the coolant after the N-17 and short lived groups of delayed neutron emitters (half lives less than five seconds) have a chance to decay to a negligible level. The second neutron detector monitors the coolant after an additional delay period, chosen to obtain a signal which differs significantly from the signal of the first detector. The ratio of the signals received from the two detectors is a function of the fission products released from surface contamination and from cladding failures. The contribution to the ratio from surface contamination remains constant throughout reactor life and can be calibrated at the beginning of reactor operation in the absence of failed fuel. After such a calibration procedure is employed, any further change in the ratio will indicate the presence of a failed fuel rod.

The provision of an additional gamma detector, which monitors the reactor coolant after the N-16 gamma radiation has had a chance to decay to a negligible level, enables the system to distinguish between enlargements in cladding failures of already failed fuel and additional fuel failures.

BRIEF DESCRIPTION OF THE DRAWINGS

For a better understanding of the invention, reference may be had to the preferred embodiment, exemplary of the invention, shown in the accompanying drawings, in which:

FIG. 5 is a schematic diagram, in black box form, of the detector circuits of this invention.

DESCRIPTION OF THE PREFERRED EMBODIMENT

This invention discloses a system which utilizes multiple radiation detectors to establish the isotopic or pseudo isotopic (weighted average of several isotopes) content of radiation sources on a continuous on-line basis. A specific application which utilizes this principle is a failed fuel monitor which continuously monitors the delayed neutron and gamma activity emanating from the primary coolant of a nuclear reactor. Employing two neutron detectors, monitoring the radiation from the reactor coolant at two different delay times, the system has the ability to distinguish between the activity from failed fuel and from fuel rod surface contamination. Applying a technique to compensate for the activity build-up in the primary loop, this system makes it possible to interpret the signals even during power transient conditions.

Figure 1:
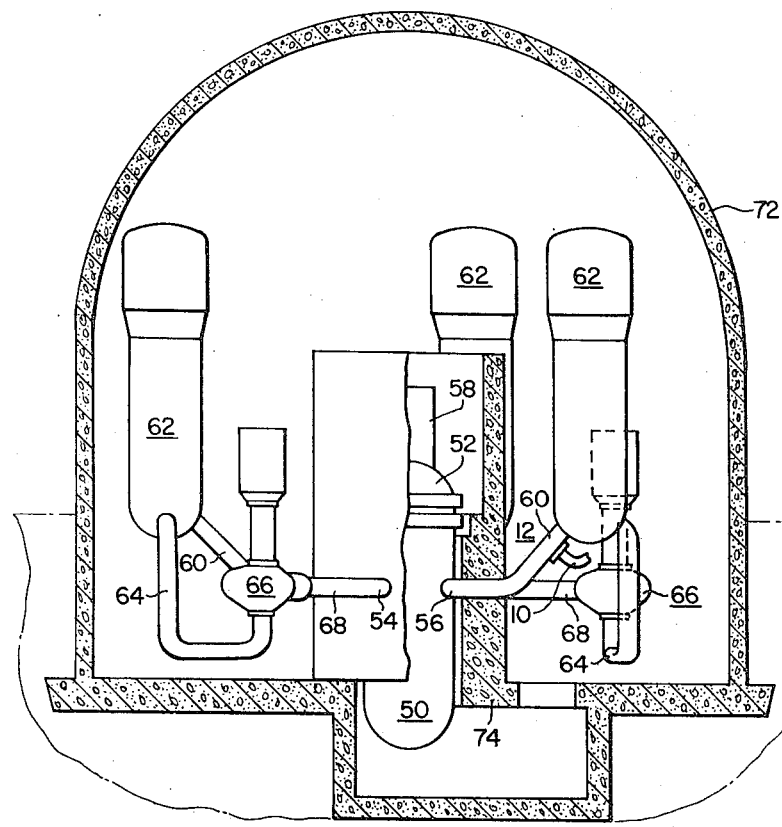
FIG. 1 is a side view, partially in section, of a nuclear steam generating system incorporating this invention.

Referring now to FIG. 1, there is illustrated a nuclear steam generating system of the pressurized water type which is adaptable for use with the failed fuel detection system of this invention. A pressurized vessel 50 is shown which forms a pressurized container when sealed by its head assembly 52. The vessel has coolant flow inlet means 54 and coolant flow outlet means 56 formed integral with and through its cylindrical walls. As is known in the art, the vessel 50 contains a nuclear core (not shown) consisting mainly of a plurality of clad nuclear fuel elements which generate substantial amounts of heat depending primarily upon the position of a control means; the pressure vessel housing 58 of which is shown. The heat generated by the reactor core is conveyed from the core by the coolant flow entering through inlet means 54 and exiting through outlet means 56.

Figure 2:
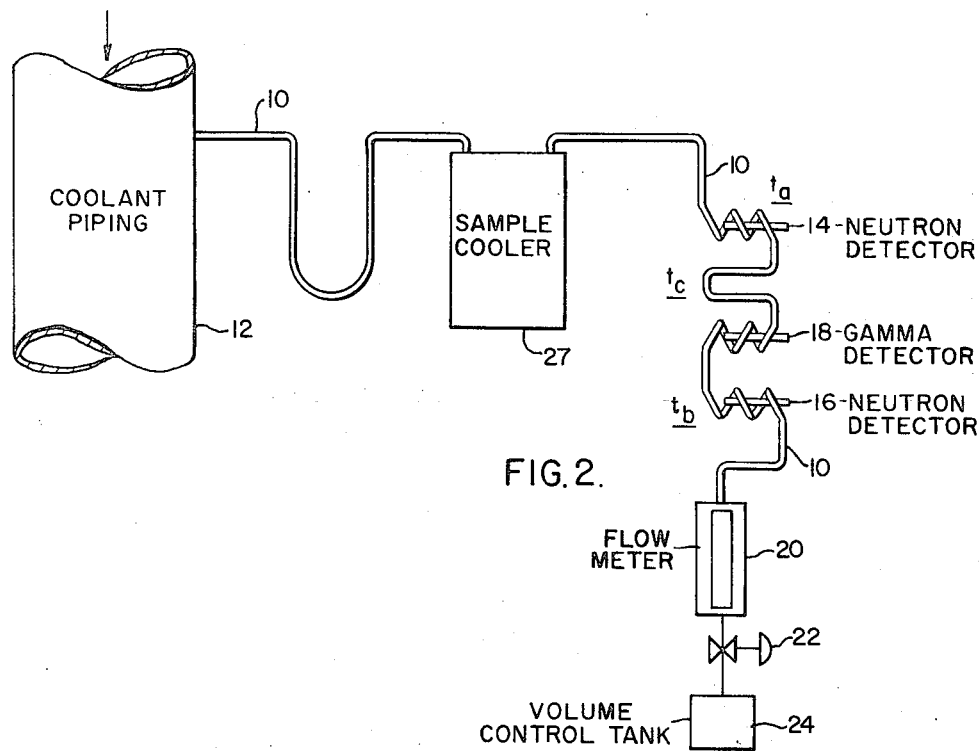
FIG. 2 is a schematic diagram illustrating the location of the detector components of this invention.

The flow exiting through outlet means 56 is conveyed through hot leg conduit 60 to a heat exchange steam generator 62. The steam generator 62 is of a type wherein the heated coolant flow is conveyed through tubes (not shown) which are in heat exchange relationship with the water which is utilized to produce steam. The steam produced by generator 62 is commonly utilized to drive a turbine (not shown) for the production of electricity. The flow is conveyed from the steam generator 62 through conduit 64 to a pump 66 from which it proceeds through cooled leg conduit 68 to inlet means 54. Thus it can be seen that a closed recycling primary or steam generating loop is provided with the coolant piping, generally described by reference character 12, communicably coupling the vessel 50, the steam generator 62 and the pump 66. The generating system illustrated in FIG. 1 has three such closed fluid flow systems or loops. The number of such systems should be understood to vary from plant to plant, but commonly two, three or four are employed. In the unlikely event of a failure, or rupture, of the fuel rod cladding serious radioactive emission can occur wherein the fission products from the fuel would enter the coolant and thereby increase the radioactivity of the coolant resulting in an increase in radioactivity within the containment 72. In order to guard against this contingency and provide an early warning of an increase in radioactivity within the coolant due to fuel rod failures this invention provides a continuous on-line radioactivity monitoring system which will be explained in detail with regard to the description of FIG. 2. According to the specific embodiment illustrated herein as exemplary of this invention two neutron detectors monitor a sample of the reactor coolant tapped from the coolant piping 12 via conduit 10. The two neutron detectors 14 and 16, illustrated in FIG. 2, are deployed at two different locations along conduit 10 to allow for the decay of selected neutron emitters within the reactor coolant. Conduit 10 is located within the reactor containment structure 72 communicably coupled to the coolant piping 12, preferably outside of the reactor missile barrier 74. Conduit 10 is desirably affixed to the hot leg conduit 60, upstream of the steam generator 62, so that the detectors are responsive to the neutrons emitted from the coolant before the monitored activity decays to a negligible level.

In its broadest scope this invention pertains to sources of radiation composed of one or more radioactive isotopes characterized by their half lives, migration time, and concentration present at any time. Multiple detectors (for example neutron and/or gamma) can be utilized to establish the isotopic or pseudo isotopic (weight average of several isotopes) content of the radiation source on a continous on-line basis. One specific application of this principle is described in the following paragraph which is generally applicable to nuclear reactors and in the specific embodiment illustrated as exemplary of this invention, to nuclear reactors of the pressurized water type. This system monitors the fission products within the reactor coolant to provide an early indication of the presence of failed fuel within the reactor core.

FIG. 2 is a schematic diagram of an on-line failed fuel monitoring system exemplary of this invention. An enlarged section of the coolant piping 12 is illustrated with conduit 10 formed integral with and through its cylindrical walls. Conduit 10 taps a sample of the coolant from the coolant flow path and diverts the sample to the sample cooler 27 which cools the temperature of the coolant to a working level suitable for the detectors of this invention. Conduit 10 then proceeds to convey the coolant past the detectors 14, 16 and 18. The system thus illustrated, includes two neutron detectors 14 and 16 which form the basis of this invention, and one gamma detector 18 the function of which will be described hereinafter. The neutron detectors 14 and 16 monitor the long-lived delayed neutron groups emitted from the fission products in the coolant (Br–87, 54.5 sec. half life and I–137 + Br–88, 22.7 sec. half life). The gamma detector measures the gross gamma radiation in the coolant which consists mainly of contributions from three major components. The first component results from the decay of nitrogen 16, which is a gamma emitting isotope with a 7.35 sec. half life. The gamma activity is induced from oxygen 16 by the bombardment of very fast neutrons (greater than 6 Mev) in the reactor core. The gamma activity, at 6 Mev, is the principal radiation emitted from the primary coolant of a pressurized water reactor. The second component source of gamma radiation emanates from the fission products in the coolant which result from uranium surface contamination of the fuel rods and from any possible fuel failures. The third source of gamma radiation results from activated corrosion products and impurities in the coolant which are commonly known in the art as crud.

The most significant components of the gamma radiation are due to nitrogen 16 and fission product isotopes with half lives longer than about fifteen minutes.

Since the half lives of the delayed neutrons and the fission product gamma radiation are very different, both signals contain different information and thus are prevented from being redundant. The advantage of monitoring the gamma radiation in addition to the delayed neutrons will be discussed hereinafter.

Conduit 10 is suitably designed to provide appropriate relative delay times to the three detectors 14, 16 and 18, terminating at its down stream end in flow meter 20 and flow control valve 22. The delay times to the different detectors can then be adjusted by setting the proper flow rate via flow control valve 22. The sample coolant then collects in the volume control tank 24 which is normally provided in a building separate from the reactor containment 72 for eventual recirculation into the reactor coolant loop 12. The delay time, $t_a$, to the first neutron detector 14 is desirably adjusted to allow the N-17 activity in the coolant loop (4.15 sec. half life) and the short lived groups of delayed neutron emitters (half lives less than five sec.) to decay to a negligible level. A suitable delay period to allow for such decay would be approximately 60 seconds. The delay time to the second neutron detector 16, $t_b$, is desirably adjusted to obtain a signal which differs significantly from the signal of the first detector 14; typically about 120 seconds. The delay time to the gamma detector 18, $t_c$, must be desirably adjusted to provide a long enough period to allow the N-16 gamma radiation to decay to a negligible level; typically about 100 seconds.

The main problem in detecting failed fuel is the discrimination between activity from surface contamination and actual failed fuel; especially for the case of small fuel failures. The only difference between the activity encountered from surface contamination and the activity encountered from failed fuel is the age of the fission products produced. While the fission products from the thin layer of surface contamination are released into the coolant with essentially no time delay, it takes some migration time, $t_m$, for the fission products from failed fuel to diffuse through the fuel and penetrate the cladding rupture. The exception to this occurs for a large cladding failure which will be discussed hereinafter. Since the isotopic composition of the fission product activity varies with the migration time of the products due to the different half lives involved, the discrimination between surface contamination and failed fuel can be based upon determining the isotopic content of the fission products. For this purpose, the delayed neutron activity is used, since the half lives involved are shorter and thus the instrumentation can respond more rapidly. A similar technique can be employed with gamma detectors used in place of the neutron detectors described in this exemplary embodiment, yet much longer half lives are involved resulting in a longer response time for the system.

Figure 4:
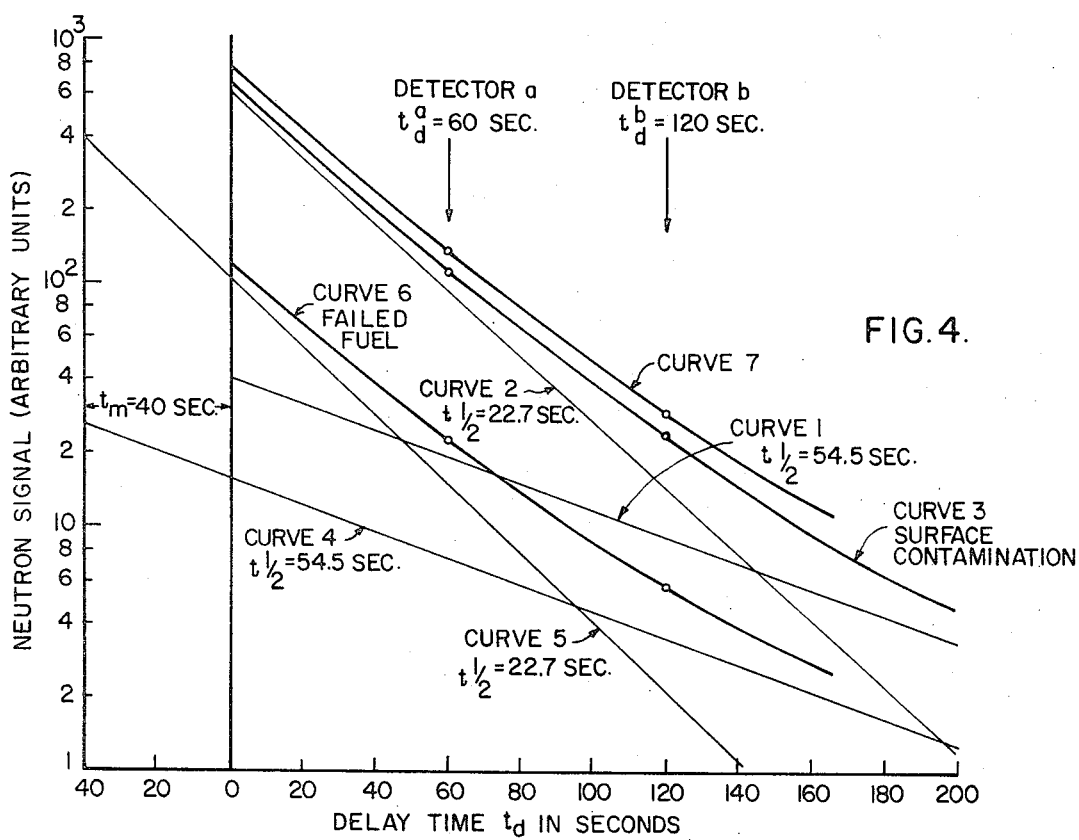
FIG. 4 is a graphical illustration of the neutron signals received by the detectors of this invention.

FIG. 4 is a graphical illustration of the neutron signals obtained at various delay times, $t_d$, for zero migration time and $t_m$ equal to 40 seconds. 40 seconds is used herein as an exemplary migration time for failed fuel. Curve 1 and curve 2 represent the signals received from the 54.5 and 27.7 sec. half life isotope groups, respectively, for a migration time of $t_m$ equal to zero. Curve 3 is the sum of curves 1 and 2. The ratio of the signals received from the second and first detectors 16 and 14, $I_b$ and $I_a$, respectively, at a delay time of 60 seconds for detector 14 and 120 seconds for detector 16 is about $R_c$ $(I_b/I_a)_c = 0.21$. It can be observed from the aforementioned curves that whenever a contribution from the older fission products ($t_m$ greater than 0 is present the signal ratio increases. This is due to the fact that for the older fission products the contribution from the longer lived isotope group if relatively higher than from the shorter lived group as illustrated in FIG. 4. Curve 6 represents a typical signal for fission products with a migration time $t_m$ equal to 40 seconds. The signal ratio for the two detectors 14 and 16 is in this case approximately $$R_f = (I_b/I_a) \; f = 0.253$$

Curve 7 is the sum of curves 3 and 6 and represents a signal which is due to failed fuel and surface contamination. The signal ratio becomes for this case $R_{f+c} = (I_b/I_a)_{f+c} = 0.217$, which is a higher value than for surface contamination alone. Thus, the signal ratio can be used to discriminate between failed fuel and surface contamination. The ratio $R_{f+c}$ depends upon the relative magnitude of the surface contamination to failed fuel contribution. The maximum ratio which can exist for failed fuel only and a migration time $t_m$ great enough so that only long lived emitters contribute to the signal is $$R_f^{max} = 0.473$$

The signal ratio for surface contamination depends only on the time delay to the first and second detectors and is therefore a constant for a given failed fuel system. This ratio may be subtracted electronically from the measured ratio $R_{f+c}$ to obtain $\Delta R$, where $$\Delta R = R_{f+c} - R_c$$

The signal $\Delta R$ becomes zero for surface contamination only in the absence of failed fuel and increases with increasing amount of failed fuel.

In the discussion of the ratio of the signals received from both detectors 14 and 16 the build-up factor $B_i$ has not yet been considered. The build-up process is time dependent and needs more time for isotopes with smaller half lives. Thus, the isotope ratio changes during power transients if both the surface contamination signal and the failed fuel signal are assumed to be proportional to the reactor power level. Thus, the signal ratio does not show the correct value and cannot be interpreted properly. To overcome this problem the detector signal can be compensated for the build-up effect by means of an electronic device similar to the compensation system described in application Ser. No. 102,617 617, entitled "N-16 Reactor Power Measuring system," filed Dec. 30, 1970 and assigned to the assignee of the present invention.

Figure 3:
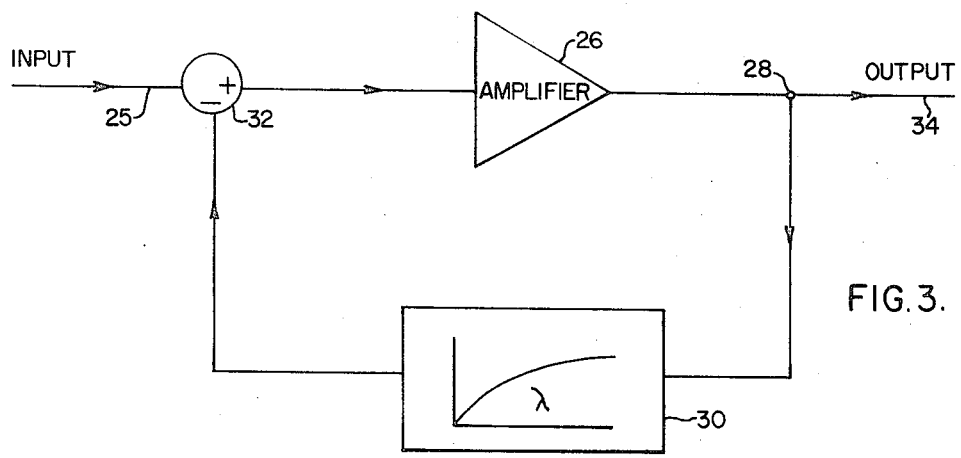
FIG. 3 is a schematic diagram of the build-up compensation circuit of this invention.

The build-up of activity in the primary loop follows a first order exponential function with a time constant $\tau = 1/\lambda_i$. This build-up can be compensated for electronically as schematically illustrated in FIG. 3. The input signal 25 from the detector, is first amplified by amplifier 26 and then a portion of the signal is diverted at terminal 28 to the build-up simulator 30 which simulates electronically the build-up effect for subtraction from the input signal 25 at terminal 32 to produce a true output signal 34. For a more detailed understanding of the electronic build-up compensation circuit employed by this invention reference should be had to the aforementioned application.

However, the build-up compensation can only be performed for a given ratio of the long lived isotope component to the shorter lived isotope component of the signal. This is because the build-up compensation circuits must be adjusted separately for both signal components, having different decay constants $\lambda_1 + \lambda_2$, with the associated build-up factors $B_1$ and $B_2$, respectively. Since the ratio of the single components is known only for surface contamination, the build-up compensation can only be adjusted for this signal contribution. Therefore, as long as only surface contamination is present, the detector signals follow all transient conditions without changing the ratio of the two isotope components, which would not be the case without build-up compensation; due to the different time behavior of the two build-up factors. However, with an increasing contribution from failed fuel, interpretation of the transient results becomes more difficult. At any time during reactor life a recalibration procedure is possible to adjust the build-up factors to compensate for already failed fuel without interrupting normal plant operation.

FIG. 5 illustrates a block diagram of the neutron detector system of this invention. Detector outputs from the detectors 14 and 16 are fed through the build-up compensation circuit 36 and 38. It should be understood that the detector circuits 14 and 16 include associated electronics well known in the art, to convert the detector outputs into signals per unit time. As previously described, separate compensation circuits 36 and 38 are required for the short-lived and long-lived isotopic components of the detector signals, respectively. The outputs from the compensation circuits are fed into a ratio circuit 40 which divides the signal received from detector 16 by the signal received from detector 14 to give the ratio $R_{f+c}$. Such ratio circuits are well within the state of the electrical art and therefore have not been set out in more detail. Additionally, meters 42 are provided at the output of each of the detector circuits 14 and 16, respectively, to give a direct reading of the detector outputs. The initial reading from the output of the ratio circuit 40, obtained at the beginning of reactor life in the absence of failed fuel, can then be used as the signal for subtraction from the ratio output to compensate for the detector signal component due to surface contamination, as previously described. A variable voltage source 46 such as a variac in series with a rectifier, generates the $R_c$ signal for subtraction at terminal 48. Any resultant signal appearing at meter 44 is then an indication of the presence of failed fuel within the reactor core.

An advantage of the additional gamma system, illustrated in FIG. 2 by reference character 18, is that it enables the system to distinguish between an increase in the total number of fuel rod failures and enlargements in cladding failures of already failed fuel. If the delayed neutron signal shows an increase and the gamma signal does not, the total number of failed fuel rods remain constant and only the cladding failures enlarge. This interpretation is possible due to the varying differences in half lives between the gamma and neutron radiation emitted from the reactor coolant.

Thus, a failed fuel monitor has been disclosed which continuously monitors the delayed neutron and gamma activity of the primary coolant of a nuclear reactor on an on-line basis. Employing two neutron detectors, the system has the ability to distinguish between the activity from failed fuel and from fuel rod surface contamination. Applying a technique to compensate for the activity build-up in the primary loop, this system makes it possible to interpret the signals even during power transient periods. Utilizing an additional gamma detector the system can distinguish between additional fuel failures and enlargements of already failed fuel.

We claim as our invention:

1. A nuclear failed fuel detection system for detecting the presence of fission products due to failed fuel within the coolant medium of a nuclear reactor comprising:

a first detector responsive to the radioactivity within the reactor coolant medium after the radioactivity has decayed for a first delay period;

a second detector responsive to the radioactivity in the reactor coolant medium after the radioactivity has decayed for a second delay period;

means for taking the ratio of the signals received from said second and first detectors respectively; and means for subtracting from said ratio, the component value of the ratio attributable to surface contamination.

2. The apparatus of claim 1 including means for compensating said first and second detector signals for the residual build-up of radiation within the reactor coolant medium.

3. The apparatus of claim 1 wherein said first and second detectors are responsive to the neutrons emitted from the reactor coolant medium.

4. The apparatus of claim 3 including a gamma detector responsive to the gamma radiation emitted from the reactor coolant medium after the gamma radiation has decayed for a third delay period.

5. The apparatus of claim 4 wherein said third delay period is selected to allow the N–16 gamma radiation to decay to a negligible level.

6. The apparatus of claim 4 wherein said third delay period is approximately one hundred seconds.

7. The apparatus of claim 3 wherein said first delay period is selected to allow the N–17 activity and short lived groups of delayed neutron emitters, having half lives less than five seconds, to decay to a negligible level and said second delay period is selected to obtain a signal in said second detector which significantly differs from the signal received from said first detector.

8. The apparatus of claim 3 wherein said first and second delay periods are 60 and 120 seconds, respectively.

9. The apparatus of claim 1 wherein said first and second detectors are responsive to the gamma radiation emitted from the reactor coolant medium.

10. The apparatus of claim 9 wherein said first delay period is selected to allow the N–16 gamma radiation to decay to a negligible level and said second delay period is selected to obtain a signal in said second detector which significantly differs from the signal received from said first detector.

11. The apparatus of claim 9 wherein said first delay period is one hundred seconds.

12. The apparatus of claim 9 including a neutron detector responsive to the neutron actively emitted from the reactor coolant medium after the neutron activity has decayed for a third delay period.

13. The apparatus of claim 12 wherein said third delay period is selected to allow the N–17 activity and short lived groups of delayed neutron emitters, having half lives less than five seconds, to decay to a negligible level.

14. The apparatus of claim 12 wherein said third delay period is 60 seconds.

15. A method for detecting the presence of fission products due to failed fuel within the coolant medium of a nuclear reactor comprising the steps of:
   a. measuring the radioactivity emitted from the reactor coolant medium after the radioactivity has decayed for a first delay period;
   b. measuring the radioactivity emitted from the reactor coolant medium after the radioactivity has decayed for a second delay period;
   c. taking the ratio of the radioactivity measurements received in steps (b) and (a), respectively;
   d. establishing the value of said ratio attributable to surface contamination in the absence of failed fuel; and
   e. subtracting the value of said ratio attributable to surface contamination from said ratio.

16. The method of claim 15 wherein steps (a) and (b) measure the neutron activity emitted from the reactor coolant medium.

17. The method of claim 16 including the steps of:
   measuring the gamma radiation emitted from the reactor coolant medium after the gamma radiation has decayed for a third delay period; and
   detecting an increase in said neutron measurements in the absence of an increase in said gamma measurements.

18. The method of claim 15 including the step of compensating the measurements obtained in steps (a) and (b) for the residual build-up of radiation within the reactor coolant medium.

* * * * *